(12) United States Patent
Al-Mutairi

(10) Patent No.: US 8,371,035 B2
(45) Date of Patent: Feb. 12, 2013

(54) COMBINED SET OF INTERACTING INSTRUMENTS

(76) Inventor: Mohammed Marzouq Khalaf Al-Mutairi, Fahaheel (KW)

( * ) Notice: Subject to any disclaimer, the term of this patent is extended or adjusted under 35 U.S.C. 154(b) by 203 days.

(21) Appl. No.: 12/896,992

(22) Filed: Oct. 4, 2010

(65) Prior Publication Data
US 2012/0079729 A1    Apr. 5, 2012

(51) Int. Cl.
*B43L 9/02* (2006.01)
*B43L 7/10* (2006.01)
(52) U.S. Cl. .......................... 33/27.02; 33/495
(58) Field of Classification Search ............ 33/27.02, 33/494–499, 500, 483–485, 481, 476, 478, 33/424, 418
See application file for complete search history.

(56) References Cited

U.S. PATENT DOCUMENTS

| | | | | |
|---|---|---|---|---|
| 230,975 | A * | 8/1880 | Walters | 33/43 |
| 538,051 | A * | 4/1895 | Taylor | 33/418 |
| 912,605 | A * | 2/1909 | Osmonson | 33/456 |
| 1,945,987 | A * | 2/1934 | Ware | 33/418 |
| 2,054,420 | A * | 9/1936 | Hochman | 33/495 |
| 2,178,796 | A * | 11/1939 | Kormann | 33/495 |
| 2,220,753 | A * | 11/1940 | Chyz | 33/485 |
| 2,244,125 | A * | 6/1941 | Siefker | 33/457 |
| 2,352,169 | A * | 6/1944 | Alexander | 33/484 |
| 2,857,674 | A | 10/1958 | Feldhacke | |
| 4,843,719 | A * | 7/1989 | Straten | 33/27.02 |
| 5,090,129 | A * | 2/1992 | Cunningham | 33/481 |
| 5,426,859 | A | 6/1995 | Concari | |
| 5,461,794 | A * | 10/1995 | Huang | 33/470 |
| 5,628,118 | A | 5/1997 | Rivera | |
| 5,915,807 | A | 6/1999 | Ilagan | |
| 5,983,509 | A * | 11/1999 | Gosselin et al. | 33/1 SD |
| 6,070,334 | A * | 6/2000 | Pretsch, Jr. | 33/474 |
| 6,405,443 | B1 | 6/2002 | Thorn | |
| 6,421,928 | B1 * | 7/2002 | Miller | 33/520 |
| 6,886,268 | B1 * | 5/2005 | Morse | 33/647 |
| 7,302,763 | B1 * | 12/2007 | Matthews | 33/562 |
| 7,373,727 | B2 * | 5/2008 | Bruce | 33/455 |
| 7,464,476 | B2 | 12/2008 | Le | |
| 2007/0227022 | A1 * | 10/2007 | Bruce | 33/455 |
| 2012/0079729 | A1 * | 4/2012 | Al-Mutairi | 33/27.02 |

* cited by examiner

*Primary Examiner* — Yaritza Guadalupe-McCall
(74) *Attorney, Agent, or Firm* — Lowe Hauptman Ham & Berner, LLP

(57) ABSTRACT

A combined set of interacting instruments for constructing and analyzing mathematical figures includes a ruler, an adjustable triangle assembly, a compass and a protractor. The ruler includes an elongated strip of rigid or semi-rigid plastic having a length, width and relatively thin thickness. A pivot point is provided in a general middle portion of the ruler together with three parallel longitudinally extending guideways along portions of the ruler. One of the guideways includes a positioning hole for a writing instrument to act as a compass. The triangular assembly includes two moveable elements having first and second ends with the two elements pivotally connected together at one end of each of the elements so they can be disposed in an end to end relationship. The moveable elements also have a guide follower that fits within one of the guideways in the ruler. A protractor is also made of a thin sheet of plastic material and has a generally flat base portion and arcuate upper portion with angular indications between 0 and 180° marked on the base and upper portions. The protractor also includes a pair of guide followers for positioning within a second of said longitudinally extending guideways.

2 Claims, 2 Drawing Sheets

COMBINED SET OF INTERACTING INSTRUMENTS

FIELD OF THE INVENTION

This invention relates a combined set of interacting instruments for constructing and analyzing two dimensional mathematical figures and more particularly to a combined set of interacting instruments that include a ruler, an adjustable triangle assembly, a compass and a protractor.

BACKGROUND FOR THE INVENTION

Combination instruments for drafting and geometric construction are well known and have been in use for many years. For example, a U.S. Pat. No. 2,054,420 of Hochman, discloses a combination drafting implement that includes a ruler, a protractor and a compass. A protractor includes a generally semi-circular arc plate with the usual angle scale markings thereon. A protractor and scale elements are preferably distinct so that each can be used independently of the other according to conventional practices.

A more recent drafting instrument is disclosed in a patent of Concari et al., U.S. Pat. No. 5,426,859. As disclosed therein an instrument for performing various drawing and measurement functions is disclosed. The instrument includes an elongated plate having a straight edge and a measurement region. A protractor plate is connected to the elongated plate and cooperates with a rotatable center dial for the drawing and measuring of angles. The instrument also preferably includes holes through the elongated plate. The holes are configured to receive a marking instrument so the device can be used as a compass. Additionally, an attachment region allows the instrument to be held in a conventional ring binder.

Finally, a U.S. Pat. No. 6,405,443 of Thorn et al. discloses a geometric construction device. The device forms circles or arcs with a marking instrument and simultaneously measures angles. The device includes a radius arm and a rotatable member. The radius arm includes means for receiving the marking instrument and a disc having a pivot point and being rotatable about the pivot point. The disc is used to attach the rotatable member to the radius arm. The rotatable member in combination with the radius arm forms a 360° protractor. The rotatable member has a plurality of radius holes in it for receiving the marking instrument. These radius holes may be used to form circles or arcs with the radius being less than or equal to the radius of the disc. The 360° protractor is capable of measuring degrees between 0° and 360° while circles or arcs are being formed.

Notwithstanding the above it is presently believed that there is a need and a potential commercial market for an improved set of interacting instruments. There should be a need for such sets because they include a ruler, an adjustable triangle assembly, a compass and a protractor. Further, it is believed that such devices can be manufactured and sold at a competitive price, are durable and easy to use to construct or analyze mathematical figures.

BRIEF SUMMARY OF THE INVENTION

In essence the present invention contemplates a combined set of interacting instruments for constructing and analyzing two dimensional mathematical figures. The set includes a ruler, an adjustable triangle assembly with variable included angles, a compass and a protractor. The ruler includes an elongated strip of material having a length, width and relatively thin thickness and defines at least one straight edge along one side of the width and extending along the length with units of length marked thereon. A pivot point in a generally middle portion of the ruler is included as well as a pair of parallel longitudinally extending guideways that extend over a major portion of the length of the ruler. In addition, a third longitudinally extending guideways is parallel with the two guideways extends between the pivot point and one end of the ruler and includes a sliding positioning hole disposed in the third guideway for positioning a marking instrument for rotation about the pivot point to act as a compass.

The triangular assembly includes two moveable elements for forming two sides of the triangle and having first and seconds ends with the two moveable elements pivotally connected together at one end of each of the moveable elements whereby the moveable elements are disposable in an end relationship with an included angle of up to 180° line along at least one straight edge of the ruler and each of the two elements include a guide follower at an opposite from the pivotal connection between the two moveable elements. The guide follower interacts with one of the two guideways in the ruler for forming a triangle with one side of the triangle formed by the straight edge of the ruler.

Finally, the set of instruments includes a protractor comprising a thin sheet of material having a generally flat face portion and an upper portion with angular indications between 0 and 180° on the base portion and upper portion as in a conventional protractor. The protractor also includes a pair of guide followers at opposite ends of the base portion for positioning the protractor on the ruler for slideable movement along the length thereof and for measuring the included angles between the ruler and each of the moveable elements.

The invention will now be described in connection with the accompanying drawings wherein like reference numerals have been used to indicate like parts.

DESCRIPTION OF THE PREFERRED EMBODIMENTS OF THE INVENTION

Figure 1:
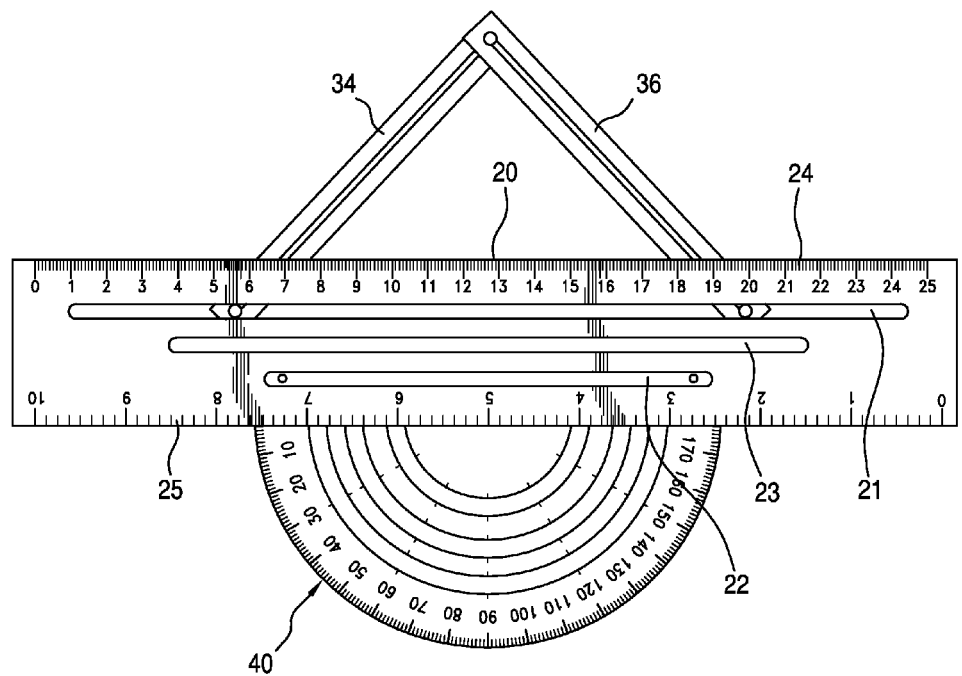
FIG. 1 is a top view of a ruler triangle assembly and pivot point and including three slot like guideways extending along a major portion of the ruler.
Figure 4:
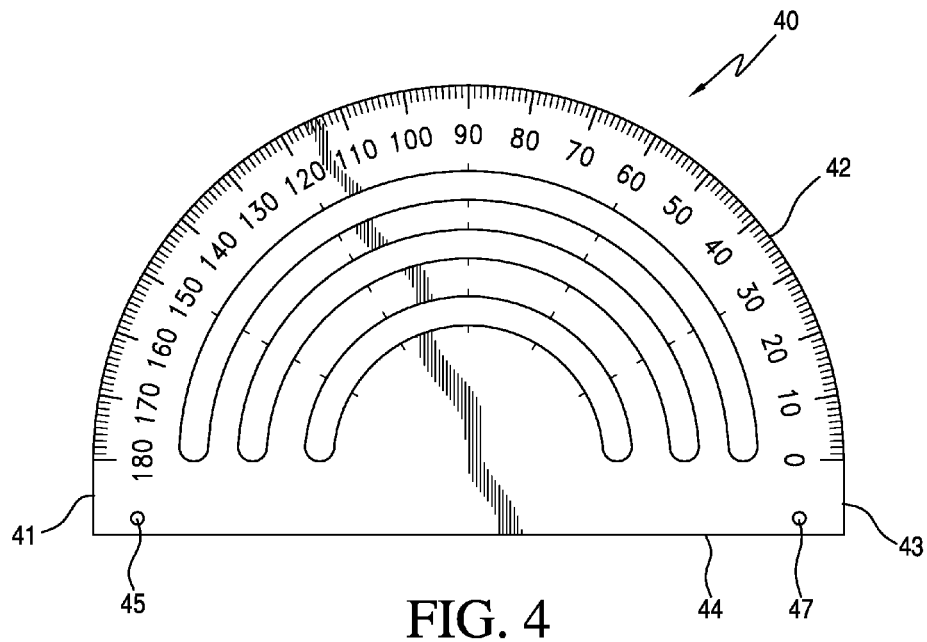
FIG. 4 is a upper plan view of a protractor as used in the present invention.

A combined set of interacting instruments in accordance with the present invention will now be described in connection with the accompanying figures. For example, FIG. 1 shows a ruler 20 that includes a rigid or semi-rigid ruler having a length of between 12 and 18 inches (30.5 to 45.7 cm) a width of between about 1 to 2 inches (2.54 to 5.1 cm) and a thickness of about 1/16 to 3/16 inches (0.25 to 0.75 cms). In a preferred embodiment of the invention the ruler 20 includes three longitudinally extending guideways or slots 21, 22 and 23. The ruler 20 also includes two straight edges 24 and 25 a first of which is marked and divided into inches and the second into centimeters.

Figure 2A:
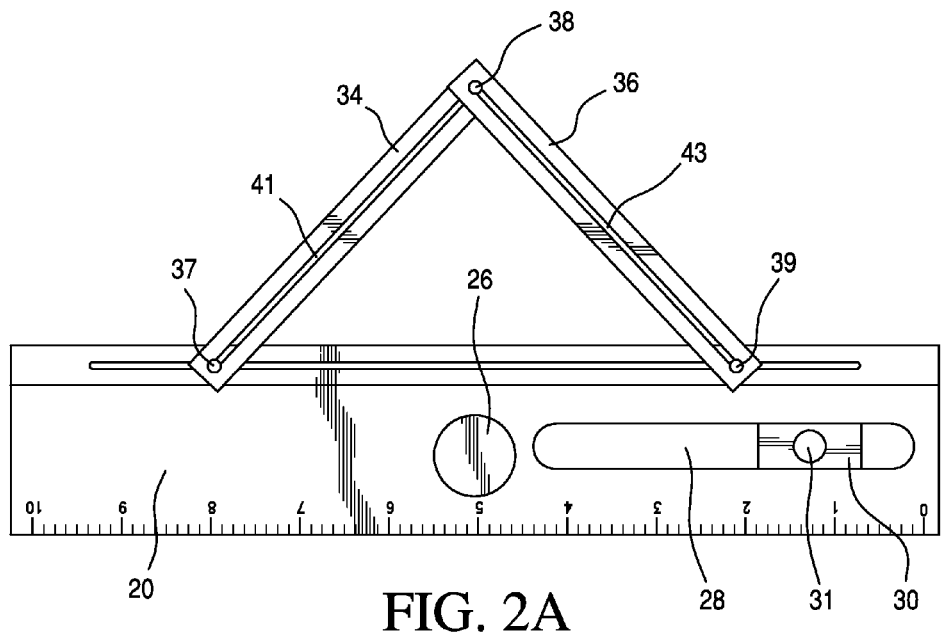
FIG. 2a is a top view of the ruler shown in FIG. 1 with an erected triangle and a pivot point extending therethrough.
Figure 2B:
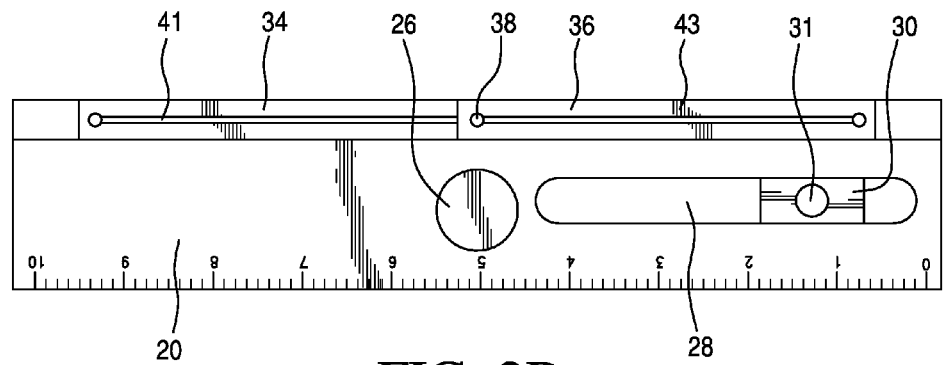
FIG. 2b is a top view of the ruler shown in FIG. 2a with the triangle compressed.
Figure 3:
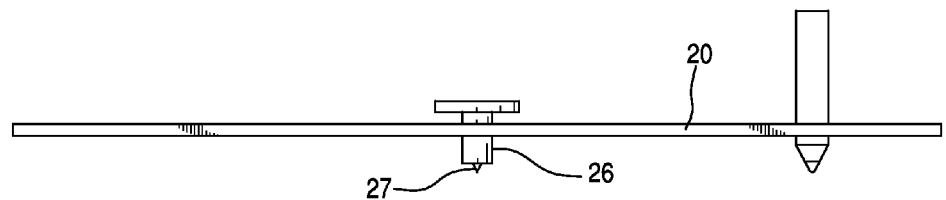
FIG. 3 is an edge rule of the ruler shown in FIGS. 1, 2a and 2b.

The ruler 20 also includes a pivot 26 as shown in FIGS. 2 and 3 near the center of the ruler 20. The pivot 26 also includes a point 27 (FIG. 3) for anchoring the ruler to a piece of paper.

As shown in FIG. 2, the ruler 20 also includes a guideway 28 that is preferably wider than the guideways or slots 21, 22 and 23. As shown the guideway 28 includes a sliding member 30 having a small opening 31 for positioning a writing instrument (not shown) at various distances from the pivot 26. For example, the number 30 is moveable along the guideway 28 with some resistance in order to position a pencil or the like at a selected position at a pre-selected distance from the point 27. The writing instrument is then rotated to scribe a circle with a selected radius around the point 27.

An important aspect of the present invention is illustrated more clearly in FIGS. 2a and 2b wherein the ruler 20 includes the guideway 21 along one side thereof that extends along a better part of the length of the ruler 20. As shown, a triangular assembly 35 includes two moveable elements 34 and 36 that each form one side of a triangle. The elements 34 and 36 are pivotally connected at pivot 38 at one end of each of the elements 34 and 36. At opposite ends of the moveable elements 34 and 36 a follower such as a short pin 37 and 39 are fitted to extend into a slot i.e. guideway 21. As shown in FIG. 2B the moveable elements 34 and 36 are pivotally attached to the pivotal connector 38 and form a triangle with included angles between the straight edge 24 and the moveable element 34 and also with the moveable element 36 as well as an included angle between the two moveable elements 34 and 36.

The moveable elements 34 and 36 each include a longitudinally extending slot 41 and 43 that extend from the pivotal connector 38 so that two of the sides 34 and 36 of the triangle can be shortened as well as shortening the side formed by the straight edge 24. The two moveable elements 34 and 36 can also be positioned in an end to end relationship to thereby form a straight edge along the one side of the ruler 20 as shown in FIG. 2B. In one embodiment of the invention, the followers 37 and 39 are attached to the guideway 21 to permanently fix the triangular assembly 35 to the ruler 20. It is also contemplated that the followers 37 and 39 may be removeable from the guideway 21 so that the ruler 20 can be used independently of the triangular assembly 35 as for example as a compass.

The instrument set also includes a protractor 40 that is made from a relatively thin plastic sheet having a thickness of between about 1/16 inch to about 3/16 inch and preferably about 1/8 inch thick. The protractor 40 includes an arcuate or arc shaped upper portion 42 and flat base 44. The flat base 44 has opposite ends and portions 41 and 43 with pin like guideway followers 45 and 47. The pin like guideway followers 45 and 47 are preferably disposed in the guideway 23 so that the protractor 40 can be slid back and forth along the ruler 20 to construct or measure two sides of a triangle or sides of other figures.

In one preferred embodiment of the invention the angular deviations on the upper portion of the protractor 40 include angular indications of 1 to 180° and underneath those indications of 180° to 1° to measure acute as well as obtuse angles. The protractor 40 may also include three parallel arc shaped grooves 48, 49 and 50 of different radius. The openings or groves 48, 49 and 50 may also include indications of angular deviation from a center point 51 on the base of the protractor 40.

While the invention has been described in accordance with its preferred embodiment it should be recognized that changes and modifications may be made therein without departing from the scope of the appended claims.

What is claimed is:

1. A combination set of interacting instruments for construction and analyzing two dimensional mathematical figures, said combined set of interacting instruments comprising:
    a ruler, an adjustable triangle assemble with variable included angles, a compass and a protractor fixed to said ruler, and wherein;
    said ruler comprising an elongated strip of relatively rigid transparent plastic material having a length, width, and relatively thin thickness and said ruler defining a straight edge along one side of said width and extending along said length with units of length marked thereon, a pivot point in a generally middle portion of said ruler in which said pivot point extends through said ruler and includes a pointed end for anchoring said ruler and a pair of parallel longitudinally extending guideways and said ruler also including a third guideway parallel with said two guideways along the length of said ruler between said pivot point and one end thereof and a sliding positioning hole disposed in said third guideway for positioning a marking instrument rotatable about said pivot point to act as a compass; and in which said guideways in said ruler are slots extending through said ruler and said guide followers are relatively short pins that extend into said slots;
    a triangular assembly including two moveable elements for forming two sides of a triangle and having first and second ends with said two moveable elements pivotally connected together at one end of each of said moveable elements whereby said moveable elements are disposed in an end to end relationship with an included angle of up to 180° along said straight edge of said ruler and each of said two moveable elements including a guide follower at an opposite end from said pivot connection between said two moveable elements and said guide follower interacting with one of said two guideways in said ruler for forming a triangle with one side of said triangle formed by said straight edge of said ruler; and which includes a longitudinally extending slot in one of said moveable elements that extends from said pivotal connection between said two moveable elements along the length of said element for shortening one side of said triangle; and in which said triangular assembly is permanently connected to said ruler; and
    said protractor comprising a thin sheet of said transparent material having a flat base portion and an arcuate upper portion with angular indications between 0 and 180° on said base portion and said upper portion and said protractor including a pair of guide followers at opposite ends of said base portion for positioning said protractor on said ruler along the length thereof and for measuring the included angle between said ruler and each of said moveable elements; and
    in which said protractor includes three parallel arc shaped grooves in an upper portion thereof.

2. A combined set of interacting instruments for constructing and analyzing two dimensional mathematical figures, said combined set of interacting instruments consisting of:
    a ruler, an adjustable triangle assemble with variable included angles, a compass and a protractor, and wherein;
    said ruler consists of an elongated strip of rigid or semi-rigid transparent material having a length of between about 12 and 18 inches (30.48 and 45.72 cms), a width of about 1 to 2 inches (2.54 and 5.08 cms) and a thickness of between about 1/16 and 3/16 inch (about 0.16 to 0.48 cm) and said ruler defining a straight edge along each side of said width with inches of length marked on one side and centimeters indicated on the opposite side, a pivot point including a relatively sharp point extending through a generally middle portion of said ruler with a pointed end to fix said pivot point to a backing and a pair of parallel longitudinally extending selected guideways parallel with one of said straight edges and a third slotted guideway parallel to said pair of guideways but extending between said pivot point and one end of said ruler and a sliding positioning hole disposed in said third guideway for positioning a marking instrument that rotatable about said pivot point to act as a compass;

a triangular assembly including two moveable elements for forming two sides of a triangle and each of said moveable elements having first and second ends with said two moveable elements pivotally connected together at one end of each of said moveable elements whereby said moveable elements are disposable in an end to end relationship with an included angle therebetween of up to 180° along one of said straight edges of said ruler and each of said moveable elements including a guide follower at an opposite end from said pivot connector between said moveable elements and said guide followers interacting with and permanently fixed within one of said two guideways in said ruler for forming a triangle with one side of said triangle formed by said straight edge of said rule;

said protractor comprising a thin transparent sheet of rigid or semi-rigid plastic having a flat base portion and an arcuate upper portion with angular indications between 0 and 180° in said base portion and said upper portion of said protractor including a pair of guide followers at opposite ends of said base portion for fitting into said second of said pair of guideways for measuring the included angle between said ruler and each of said moveable elements; and both of each moveable elements including a longitudinally extending slot connected to said pivot connector between said moveable elements to shorten two sides of said triangle.

\* \* \* \* \*